Patented July 20, 1937

2,087,614

UNITED STATES PATENT OFFICE 2,087,614

BINDING AGENT FOR ROAD CONSTRUCTION

Ernst Bürgin, Bitterfeld, Germany, assignor to I. G. Farbenindustrie Aktiengesellschaft, Frankfort-on-the-Main, Germany No Drawing. Application June 28, 1935, Serial No. 28,874. In Germany July 7, 1934

8 Claims. (Cl. 106—32)

The present invention relates to improvements in the physical properties of tars, particularly when used as binding agents for road construction, and to process of obtaining same.

It is known that the suitability of tars for the purpose of road construction depends in a high degree on their binding properties. These in turn depend on a series of physical constants, of which the individual effect has not as yet been clearly ascertained. Thus the binding properties of tars are influenced by the adhesiveness of the tar to the stony material used as filler and by the internal cohesive properties of the tar as such, which in turn depend on its viscosity and ductility. The binding effect of the tar becomes apparent, when the mixture of the tar with a filling material is molded, in the shearing strength of the molded masses. Attempts have been made to express these factors, which are considered as of importance in determining the usefulness of the binding agent, by quantitative figures and to prescribe certain rules involving the said figures for ascertaining the value of tars as binding agents.

I have found that the properties of tars, which are characteristic of their utility as binding agents, are improved to a high degree by the addition of a small amount of chlorinated polyvinyl chloride, the increase in their binding properties thus produced being such that the tars become particularly suitable as binding agents for road construction.

The chlorinated polyvinyl chloride is a polymerized vinyl chloride, which contains an excess over that amount of chlorine which corresponds to the chlorine content of vinyl chloride according to its accepted chemical formula. The chlorinated polyvinyl chloride, having a content of chlorine of about 58% to about 70%, may be used for the present purpose, preferably a chlorinated polyvinyl chloride of about 68% of chlorine is used.

The chlorinated polyvinyl chloride is preferably prepared by treating polymerized vinyl chloride in the presence of an organic solvent or swelling agent with chlorine as has been described in U. S. Letters Patent 1,982,765. However, chlorinated polyvinyl chloride prepared by any other processes can be used for the present purpose.

The present invention accordingly comprises the incorporation of a chlorinated polyvinyl chloride in tars particularly coal-tars used as binding agents for road construction and the products obtained thereby.

For the purpose of the present invention road binding agents based on tars, such as coal-tars, are suitable. The chlorinated polyvinyl chlorides are added to the tar in a small amount, for instance from 0.1 to 1.5% calculated on the amount of said tar.

The tars according to the present invention containing an addition of chlorinated polyvinyl chlorides are distinguished by an improved ductility compared with the tar as such, as is illustrated by the following test.

Two burettes A and B having both an outlet of 2 mm. diameter are filled each with 50 cm.$^3$ of a coal-tar consisting of 60% coal-tar pitch and of 40% anthracene oil. The tar of burette A contains an addition of 0.6% of chlorinated polyvinyl chloride of 68% chlorine content, whereas the tar of burette B does not contain such an addition. When allowed to flow from the burette at a temperature of 25° C. the tar of the burette A forms a fine thread of about 6$\mu$ diameter to a length of about 3 m. before rupture of the thread occurs, whereas the thread of tar flowing from burette B breaks at about 25 cm. distance from the burette, the diameter of the thread being 1000$\mu$.

The chlorinated polyvinyl chloride can be incorporated in the tars either in its solid form, for instance as a powder which is thoroughly kneaded with the tar by known mechanical means, or in form of a solution in a suitable solvent, for instance methylene chloride or anthracene oil.

If chlorinated polyvinyl chloride is used dissolved in a volatile solvent, it is preferable, after the solution has been added to the tar, to expel the solvent of the chlorinated polyvinyl chloride in some suitable manner, for example by blowing hot steam through the mixture.

The following examples illustrate the invention, the parts being by weight.

Example 1

100 parts of coal-tar consisting of 60% coal-tar pitch of a softening point of 67° (identified according to the method of Kraemer-Sarnow "Chemische Industrie" vol. 26, p. 55 (1903)) and of 40% of anthracene oil are heated to about 115° C. To the heated coal-tar about 0.5 part of chlorinated polyvinyl chloride of 68% content of chlorine are added in small portions while stirring. After the chlorinated polyvinyl chloride has been dissolved in the coal-tar the product is ready for use. The product thus obtained shows improved binding properties compared with the coal-tar used as starting material.

*Example 2*

20 parts of chlorinated polyvinyl chloride of 66% content of chlorine are dissolved in 80 parts of anthracene oil at a temperature of about 110° C. 2.5 parts of the solution thus obtained are added to 100 parts of coal-tar consisting of 75% coal-tar pitch of a softening point of 67° (identified according to the method of Kraemer-Sarnow "Chemische Industrie" vol. 26, p. 55 (1903)) and 25% of anthracene oil at about 120° C. The reaction mixture is stirred until a homogeneous product has been obtained. 6.5 parts of the composition thus obtained are thoroughly mixed with 100 parts of a mineral aggregate consisting of 44% of basalt split of 3-8 mm. diameter, of 30% of sand of 0-3 mm. diameter, and of 25% of limestone dust. The mixture thus obtained is made up of sample tar concrete blocks of a surface of 6 x 50 cm². The blocks thus obtained show a resistance to pressure amounting to 165 kg./cm², whereas sample blocks prepared of untreated coal-tar show a resistance to pressure amounting to about 31 kg./cm².

It is not known why the chlorinated polyvinyl chloride produces the particular effect upon which the present invention is predicated.

Road dressings made with the aid of a binding agent treated in accordance with this invention exhibit high tenacity and are to a large extent insensible to the influence of weather, particularly to low temperatures. For example, the breaking point of the binding agent as determined by the Fraass method ("Asphalt und Teer" 30, 367 (1930)) is diminished by 10-25° (according to the kind of tar) by an addition of 0.2 percent of chlorinated polyvinyl chloride. In consequence of the high kneadability of road dressing compositions made from tars in which according to the invention chlorinated polyvinyl chloride has been incorporated and filling materials, it is possible, to increase the proportion of filling material in the road dressing as compared with mixtures hitherto found to be useful, without impairing the plasticity of the composition. For example, a mixture of 85 parts of a basalt flour filler with 15 parts of a road tar mixed with 0.2 percent of chlorinated polyvinyl chloride has the same plasticity as that of a mixture of 65 parts of the same filler with 35 parts of the same tar which has not received the addition of chlorinated polyvinyl chloride. Also the resistance to water of the road dressing made with binding agents treated in accordance with this invention is substantially improved.

It is to be noted that the viscosity and the dripping point of the tars are not materially influenced by the addition of chlorinated polyvinyl chloride, and this involves the advantage that the binding agents treated by the invention can be used without further change in the usual methods of road construction (spraying processes, macadam mixtures or the like).

What I claim is:—

1. A composition of matter comprising tar, and incorporated therewith a small amount of chlorinated polyvinyl chloride.

2. A composition of matter comprising coal-tar and about 0.1 to about 1.5% of chlorinated polyvinyl chloride calculated on the amount of coal-tar.

3. A composition of matter comprising coal-tar and about 0.1 to about 1.5% of chlorinated polyvinyl chloride of about 58 to about 70% chlorine content, calculated on the amount of coal-tar.

4. A composition of matter comprising coal-tar and about 0.6% of chlorinated polyvinyl chloride of 68% chlorine content, the amount of said polyvinyl chloride calculated on the amount of coal-tar.

5. The process of preparing a composition of matter comprising tar and chlorinated polyvinyl chloride and having superior binding properties which comprises incorporating from 0.1 to 1.5% of chlorinated polyvinyl chloride of about 68% chlorine content in said tar while applying solution temperatures.

6. The process of preparing a composition of matter containing tar and a small amount of chlorinated polyvinyl chloride and having superior binding properties which comprises dissolving in coal-tar from 0.1 to 1.5% of chlorinated polyvinyl chloride of 68% chlorine content, the amount of said polyvinyl chloride calculated on the amount of coal-tar used at a temperature of about 115° C. while stirring.

7. The process of preparing a composition of matter containing tar and a small amount of chlorinated polyvinyl chloride and having superior binding properties which comprises dissolving in coal-tar 0.5% of chlorinated polyvinyl chloride of 68% chlorine content, the amount of said polyvinyl chloride calculated on the amount of coal-tar used at a temperature of about 115° C. while stirring.

8. A bituminous composition comprising a major proportion of mineral aggregate and a minor proportion of tar binder containing a small amount of chlorinated polyvinyl chloride.

ERNST BÜRGIN.